(12) United States Patent
Guo et al.

(10) Patent No.: US 9,210,082 B2
(45) Date of Patent: Dec. 8, 2015

(54) HIGH SPEED NETWORK BRIDGING (71) Applicant: LSI Corporation, San Jose, CA (US)

(72) Inventors: Zhong Guo, Bethlehem, PA (US); Joseph A. Manzella, Macungie, PA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 224 days.

(21) Appl. No.: 13/775,675

(22) Filed: Feb. 25, 2013

(65) Prior Publication Data

US 2014/0233567 A1    Aug. 21, 2014

Related U.S. Application Data

(60) Provisional application No. 61/766,293, filed on Feb. 19, 2013.

(51) Int. Cl.
*H04L 12/28* (2006.01)
*H04L 12/741* (2013.01)
*H04L 12/743* (2013.01)
*H04L 12/773* (2013.01)

(52) U.S. Cl.
CPC .............. *H04L 45/745* (2013.01); *H04L 45/60* (2013.01); *H04L 45/7453* (2013.01)

(58) Field of Classification Search
None
See application file for complete search history.

(56) References Cited

U.S. PATENT DOCUMENTS

| | | | |
|---|---|---|---|
| 5,136,580 A | 8/1992 | Videlock et al. | 370/60 |
| 5,207,350 A | 5/1993 | Spanton | 370/85.13 |
| 6,018,526 A | 1/2000 | Liu et al. | 370/401 |
| 6,738,387 B1 * | 5/2004 | Lin et al. | 370/429 |
| 6,938,097 B1 * | 8/2005 | Vincent et al. | 709/240 |
| 7,590,076 B2 * | 9/2009 | Sumino et al. | 370/255 |
| 7,916,738 B2 | 3/2011 | Bruckner et al. | 370/401 |
| 8,238,344 B1 * | 8/2012 | Chen et al. | 370/395.32 |
| 2002/0146009 A1 * | 10/2002 | Gupta et al. | 370/392 |
| 2005/0226235 A1 * | 10/2005 | Kumar et al. | 370/386 |
| 2009/0225752 A1 * | 9/2009 | Mitsumori | 370/390 |
| 2011/0188503 A1 | 8/2011 | Hewson | 370/392 |

* cited by examiner

*Primary Examiner* — Christopher Crutchfield
*Assistant Examiner* — Thinh Tran
(74) *Attorney, Agent, or Firm* — Suiter Swantz pc llo (57) ABSTRACT

An apparatus having a parser and a circuit is disclosed. The parser is configured to generate a source address, a destination address and information by parsing a packet received via one of a plurality of networks. The circuit is configured to search a plurality of memories in parallel during a single cycle of operation in the apparatus. The searching includes a plurality of lookups in the memories of a plurality of data sets associated with the source address, the destination address and the information, respectively. The circuit is also configured to bridge the packet between the networks in response to the data sets.

20 Claims, 5 Drawing Sheets

HIGH SPEED NETWORK BRIDGING

FIELD OF THE INVENTION

The invention relates to network bridges generally and, more particularly, to a method and/or apparatus for implementing high speed network bridging.

BACKGROUND

Conventional designs of Ethernet bridge circuits do not support continuous, high-throughput processing of Ethernet packets. Content addressable memories used in such designs consume multiple system cycles to find data corresponding to a source address and a destination address of each packet. Furthermore, learning how to bridge the packets typically takes several system cycles. Therefore, the conventional designs take several system cycles to route each Ethernet packet.

SUMMARY

The invention concerns an apparatus having a parser and a circuit. The parser is configured to generate a source address, a destination address and information by parsing a packet received via one of a plurality of networks. The circuit is configured to search a plurality of memories in parallel during a single cycle of operation in the apparatus. The searching includes a plurality of lookups in the memories of a plurality of data sets associated with the source address, the destination address and the information, respectively. The circuit is also configured to bridge the packet between the networks in response to the data sets.

BRIEF DESCRIPTION OF THE FIGURES

Embodiments of the invention will be apparent from the following detailed description and the appended claims and drawings in which:

DETAILED DESCRIPTION OF THE PREFERRED EMBODIMENTS

Embodiments of the invention include providing high speed network bridging that may (i) store tables in dual-port random access memories instead of content addressable memories, (ii) work on a unique network packet every back-to-back cycle, (iii) reread addresses to determine if the addresses are already in the tables and to ensure table consistency, (iv) process a source address and a destination address at a start of a network packet for low-latency performance, (v) perform learning at an end of the network packet to ensure that the network packet should be learned, (vi) be implemented exclusively in hardware and/or (vii) be implemented as one or more integrated circuits.

A network (e.g., an Ethernet network) hardware learning technique is implemented that allows a device to learn and bridge packet addresses without software intervention. Implementing a bridging function in a network switching device exclusively in hardware enables high-speed bridging and enhances a capability of the device. Some embodiments utilize multiple (e.g., 3) dual-port random access memories (e.g., RAMs) to store data sets utilized to bridge the network packets. Each dual-port RAM can be read from and written to concurrently. The multiple dual-port RAMs are wired in parallel such that each is accessible simultaneously (or in parallel). Intermediate approaches, such as using three single-port RAMs, could also be implemented.

Each network packet received by a network switching device includes a source address and a destination address. The source address is associated with a port through which the network packet is received. The destination address is associated with a port through which the network packet is transmitted (or bridged).

Figure 1:
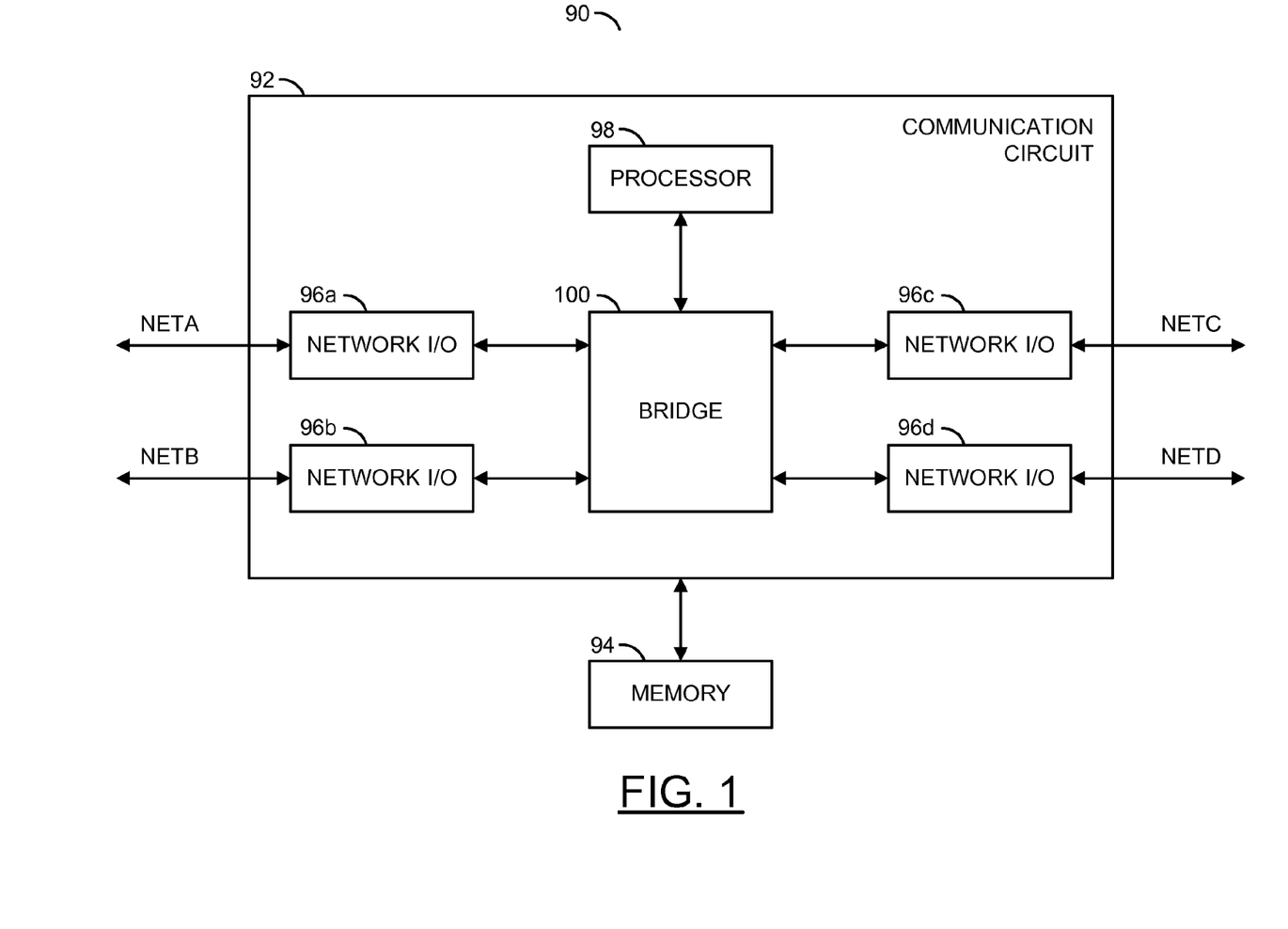
FIG. 1 is a diagram of an example implementation of a device.

Referring to FIG. 1, a block diagram of an example implementation of a device 90 is shown. The device (or apparatus or circuit or system) 90 generally implements a network switching device in a multi-network environment. The device 90 is configured to provide a bridging capability to pass (or send or direct) network packets between the various networks.

The device 90 is shown comprising a block (or circuit) 92 and a block (or circuit) 94. The circuits 92 to 94 may represent modules and/or blocks that may be implemented as hardware, software, a combination of hardware and software, or other implementations. The circuit 92 has multiple ports connected to multiple networks (e.g., NETA-NETD) respectively. The circuit 92 and the circuit 94 are shown in bidirectional communication with each other.

The circuit 92 is shown implemented as a communication processor circuit. The circuit 92 is operational to bridge network packets between the networks NETA-NETD. The circuit 92 is shown comprising multiple blocks (or circuits) 96a-96d, a block (or circuit) 98 and a block (or circuit) 100. The circuits 96a to 100 may represent modules and/or blocks that may be implemented as hardware, software, a combination of hardware and software, or other implementations. In some embodiments, the circuit 100 is implemented exclusively in hardware to achieve high-speed performance. The circuit 92 may be fabricated in (on) one or more die (or chips or integrated circuits).

The circuit 94 implements a memory circuit. The circuit 94 is configured to store the network packets, data and other information generated by and consumed by the circuit 92 during normal bridge operations. The circuit 94 may be fabricated in (on) one or more die (or chips or integrated circuits). In some embodiments, the circuits 92 and 94 can be fabricated together in (on) a common die. In other embodiments, the circuit 92 and the circuit 94 are fabricated separately from each other.

Each circuit 96a-96d is shown implemented as a network input/output (e.g., I/O) circuit. The circuits 96a-96d are operational to convert the network packets between a format used by the networks NETA-NETD and a digital format used by the circuit 100. In some embodiments, one or more of the circuits 96a-96d are implemented as serialization-deserialization circuits. In other embodiments, one or more of the circuits 96a-96d are implemented as reduced media independent interface circuits. Other serial and/or parallel network interfaces may be implemented to meet the criteria of a particular application.

The circuit 98 is shown implemented as a processor circuit. The circuit 98 is operational to execute software instructions (or code, or program instructions, or firmware, or microcode) to provide a variety of operations for the device 90. The circuit 98 generally executes the software instructions to set up operations in the device 90, provide built-in self-test functions, generate performance status information and the like. Due to speed constraints, the circuit 98 is not usually involved with the actual bridging operations when such operations are performed at high speed and in real time.

The circuit 100 is shown implemented as a bridge circuit. The circuit 100 is operational to pass (or send or direct) the network packets among the various networks NETA-NETD. The circuit 100 is shown coupled to each circuit 96a-96d and to the circuit 98. The couplings to the circuit 96a-96d support data transfers in the parallel format. In some embodiments, the circuit 100 is arranged as a pipeline configured to work on a new network packet each processing cycle.

The circuit 100 performs a sequence of steps (or operations) to bridge the network packets and learn the bridging paths. The steps can include parsing, searching and learning functions. Parsing generally involves extracting one or more fields from specific bytes in the network packets. The parsing function generates a source address, a destination address and information by parsing a network packet received at the circuit 100 via one of the networks NETA-NETD. The searching function searches multiple internal memories (e.g., the three dual-port RAMs) in parallel during a single cycle of operation in the circuit 100. The searches comprise multiple lookups in the memories of multiple data sets associated with the source address, the destination address and the information, respectively. The learning function learns how to bridge the network packets between the networks NETA-NETD in response to the data sets. Additional steps can include a hashing function and a lookup function. The hashing function generates multiple respective hash values by hashing the source address, the destination address and the information in parallel. The same hash function is applied to each of the source address, the destination address and the information. The lookup function addresses (or indexes) the memories with the hash values to read the data sets (if available) from the memories. If corresponding data sets are found, the network packet is bridged per the data sets and aging information is updated. If one or more of the corresponding data sets is missing, the circuit 100 learns the correct bridging, calculates the data sets and stores the data sets in the memories.

Figure 2:
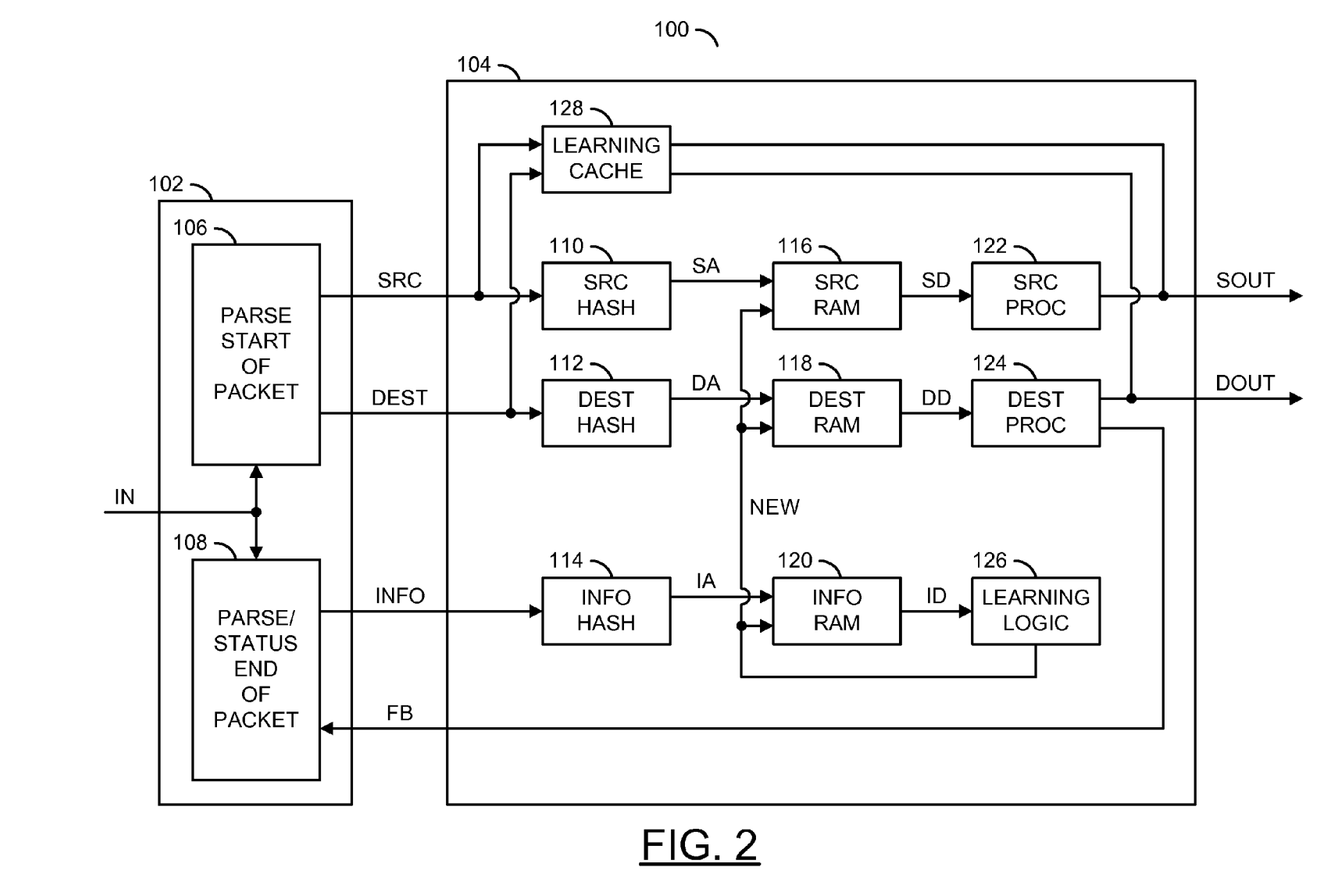
FIG. 2 is a diagram of an example implementation of a bridge circuit in accordance with an embodiment of the invention.

Referring to FIG. 2, a block diagram of an example implementation of the circuit 100 is shown in accordance with an embodiment of the invention. The circuit 100 is shown comprising multiple blocks (or circuits) 102 (one shown for simplicity) and a block (or circuit) 104. The circuit 102 is shown comprising a block (or circuit) 106 and a block (or circuit) 108. The circuit 104 is shown comprising a block (or circuit) 110, a block (or circuit) 112, a block (or circuit) 114, a block (or circuit) 116, a block (or circuit) 118, a block (or circuit) 120, a block (or circuit) 122, a block (or circuit) 124, a block (or circuit) 126 and a block (or circuit) 128. The circuits 102 to 128 may represent modules and/or blocks that may be implemented as hardware, software, a combination of hardware and software, or other implementations.

A signal (e.g., IN) is shown received by the circuit 102 (e.g., by the circuits 106 and 108). The signal IN generally conveys multiple network packets (or frames) received by the device 90 from one of the networks NETA-NETD. A signal (e.g., SRC) is generated by the circuit 106 and transferred to the circuit 104 (e.g., the circuits 110 and 128). The signal SRC carries source addresses contained in the respective network packets. A signal (e.g., DEST) is generated by the circuit 106 and transferred to the circuit 104 (e.g., the circuits 112 and 128). The signal DEST conveys destination addresses contained in the respective network packets. A signal (e.g., INFO) is generated by the circuit 108 and transferred to the circuit 104 (e.g., the circuit 114). The signal INFO carries multiple pieces of information contained in the respective network packets. A signal (e.g., FB) is generated by the circuit 104 (e.g., the circuit 124) and received by the circuit 102 (e.g., the circuit 108). The signal FB contains feedback data generated by the circuit 124. A signal (e.g., SOUT) is generated and presented by the circuit 104 (e.g., by the circuits 122 and/or the circuit 128). The signal SOUT contains processed data associated with the respective source addresses. A signal (e.g., DOUT) is shown being generated and presented by the circuit 104 (e.g., by the circuits 124 and/or the circuit 128). The signal DOUT contains processed data associated with the respective destination addresses.

Inside the circuit 104, a signal (e.g., SA) is generated by the circuit 110 and presented to the circuit 116. The signal SA contains a hashed version of the source address received in the signal SRC. A signal (e.g., DA) is generated by the circuit 112 and presented to the circuit 118. The signal DA contains a hashed version of the destination address received in the signal DEST. A signal (e.g., IA) is generated by the circuit 114 and transferred to the circuit 120. The signal IA contains a hashed version of the information received in the signal INFO. The circuit 116 generates a signal (e.g., SD) received by the circuit 122. The signal SD contains source data sets associated with the respective hashed source address values received in the signal SA. A signal (e.g., DD) is generated by the circuit 118 and transferred to the circuit 124. The signal DD contains destination data sets associated with the respective hashed destination address values received in the signal DA. The circuit 120 generates a signal (e.g., ID) received by the circuit 126. The signal ID contains information data sets associated with the corresponding hashed information values received in the signal IA. A signal (e.g., NEW) is generated by the circuit 126 and transferred to the circuits 116, 118 and 120. The signal NEW conveys new data sets to be stored in the circuits 116, 118 and 120.

The circuit 102 is shown implemented as a parser circuit. The circuit 102 is operational to parse multiple fields from each network packet received via the signal IN. The parsed data is presented to the circuit 104 in the signals SRC, DEST and INFO. Some embodiments of the device 90 are arranged to have (i) multiple circuits 96a-96d per circuit 102 and (ii) multiple circuits 102 in the circuit 100. In some embodiments, the circuit 102 is implemented only in hardware.

The circuit 104 is shown implemented as a processing circuit. The circuit 104 is operational to process the source address, the destination address and the information parsed from each network packet. The processed data is presented in the signal SOUT and DOUT. Feedback is generated by the circuit 104 and sent to the circuit 108 in the signal FB. In some embodiments, the circuit 104 is implemented only in hardware.

The circuit 106 is shown implemented as a parser circuit. The circuit 106 is operational to parse the source address and the destination address found at the start of each network packet. The source address value is presented in the signal SRC. The destination address value is presented in the signal DEST.

The circuit 108 is shown implemented as another parser circuit. The circuit 108 is operational to parse the information from the network packet and calculate a status concerning the network packet. The status may include, but is not limited to, a pass/fail status of an error checking routine and if the network packet has a learnable bridge path or not. The status calculations are generally based on the feedback data associated with the destination address as received in the signal FB.

Each circuit 110, 112 and 114 is shown implemented as a hash circuit. The circuits 110, 112 and 114 are operational to generate hash values by performing a hash operation on the data values received in the signal SRC, DEST and INFO, respectively. The hash values are presented in the signal SA, DA and IA.

Each circuit 116, 118 and 120 is shown implemented as a memory circuit. In some embodiments, each circuit 116-120 implements a dual-port RAM. Other memory technologies may be implemented to meet the criteria of a particular application. Each circuit 116-120 stores a corresponding table. Each table contains data sets for none, some or all of the addressable locations. When the circuits 116-120 are read, the data sets are presented in the respective signals SD, DD and ID.

Each circuit 122 and 124 implements an address processing circuit. Each circuit 122 and 124 is operational to generate data in the output signals SOUT and ROUT based on the data sets received in the signals DS and DD. The circuit 124 is also operational to generate the feedback data in the signal FB.

The circuit 126 is shown implemented as a learning logic circuit. The circuit 126 is operational to learn the bridging applicable to the network packets from an incoming network (or port) NETA-NETD to an outgoing network (or port) NETA-NETD.

The circuit 128 is shown implemented as a learning cache circuit. The circuit 128 is operational to store overflows from the circuit 94. If an address matches a location in the circuit 128, data stored in the circuit 128 is used instead of the data sets stored in the circuits 116 and 118 for the bridge operation.

Figure 3:
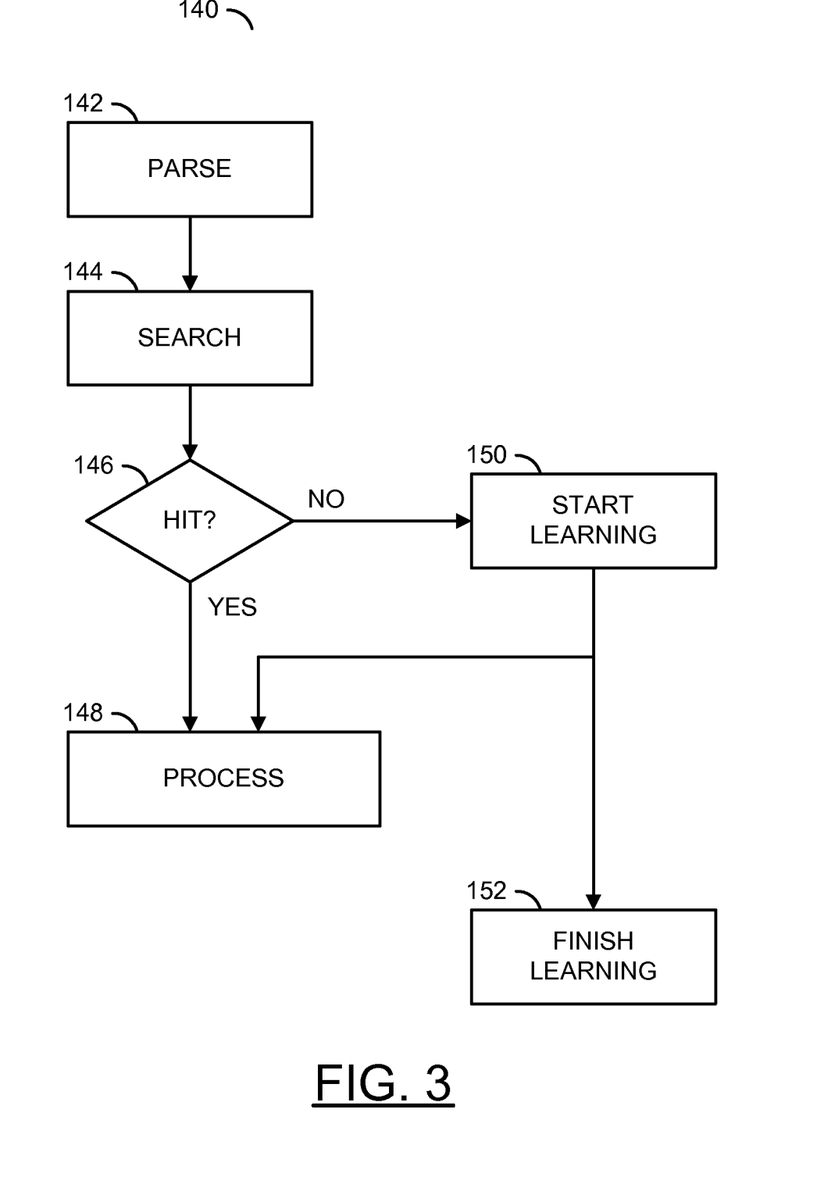
FIG. 3 is a diagram of an example method for network bridging.

Referring to FIG. 3, a functional block diagram of an example method 140 for network bridging is shown. The method (or process) 140 can be implemented by the circuit 100. The method 140 is shown comprising a step (or state) 142, a step (or state) 144, a step (or state) 146, a step (or state) 148, a step (or state) 150 and a step (or state) 152. The steps 142 to 152 may represent modules and/or blocks that may be implemented as hardware, software, a combination of hardware and software, or other implementations. In some embodiments, the steps 142 to 152 are implemented only in hardware.

When a network packet is received in the signal IN, the destination address and the source address are parsed by the circuit 106 in the step 142. In the step 144, a search is performed to determine if data sets associated with the source address and the destination address had been previously learned. If a hit occurs in the step 146, the method 140 continues with processing in the step 148 to bridge the network packet to the proper network NETA-NETD. Individual operations of the method 140 starting from the parsing step 142 to the end of the processing in the step 148 occur in individual processing cycles of the pipeline in the circuit 100. Therefore, the circuit 100 can continuously process a new network packet at the start of each new processing cycle to achieve a high throughput rate.

If a miss occurs in the step 146, a learning operation is started in the step 150 to generate new data sets. The new data sets are passed to the step 148 for processing. Over the next one or more processing cycles, the learning operation may be finished (or completed) in the step 152.

Figure 4:
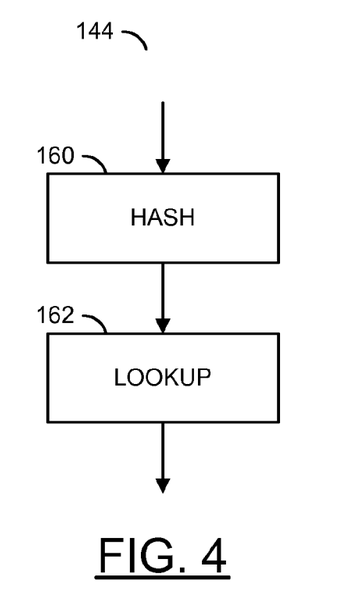
FIG. 4 is a diagram of an example implementation of a searching step.

Referring to FIG. 4, a functional block diagram of an example implementation of the searching step 144 is shown. The step 144 is show comprising a step (or state) 160 and a step (or state) 162.

In the step 160, the destination address and the source address are hashed individually by the circuits 110 and 112. The hashed address values are presented in parallel in the signals SA and DA to the circuits 116 and 118, respectively. Each hashed value of the source address and the destination address is used as the address (or index) into the circuits 116 and 118. A lookup operation is performed in the circuits 116 and 118 in the step 162 using the hashed address values.

Figure 5:
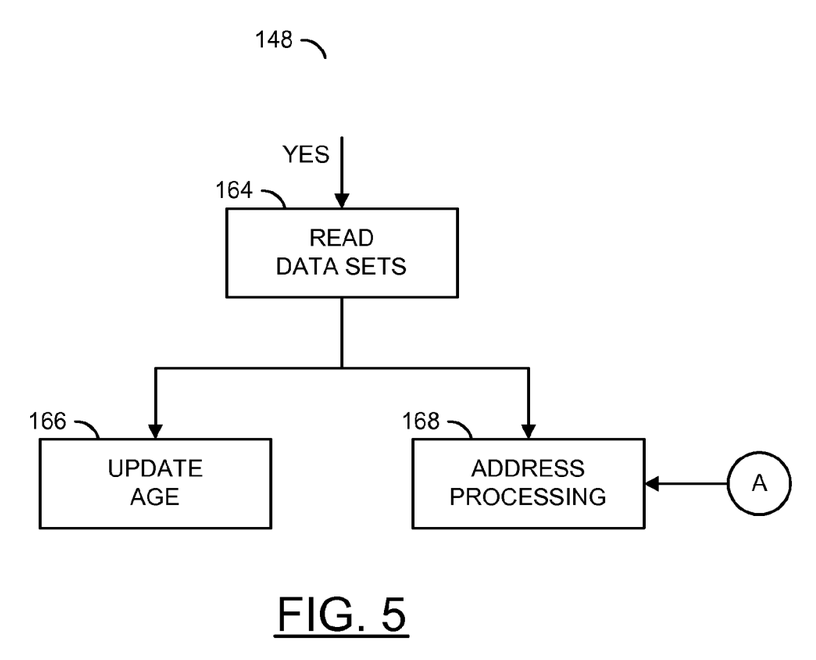
FIG. 5 is a diagram of an example implementation of a processing step.

Referring to FIG. 5, a flow diagram of an example implementation of the processing step 148 is shown. The step 148 is shown comprising a step (or state) 164, a step (or state) 166 and a step (or state) 168. The circuits 116 and 118 act as n-way (e.g., 8-way) associative caches. If a hashed address value matches (e.g., points to a populated location in the circuits 116 or 118), a hit has occurred. Therefore, data sets associated with the hashed address values are read from the corresponding circuits 116 and 118 in the step 164. The data sets corresponding to the addresses are then processed by the circuits 122-124 in the step 168. The circuit 128 stores overflows from the circuit 94 and thus allows for a larger capacity. If an address matches a location in the circuit 128, data stored in the circuit 128 is used instead of the data sets stored in the circuits 116 and 118 for the bridging function.

The learning operation (or function) is performed in a path parallel to the lookup paths for the source address and the destination address. The source address/destination address lookups occur during a start-of-packet period. The learning lookup happens at an end-of-the-packet period after the parsing function, an access control list (e.g., ACL) lookup (or process) and a bridge layer (e.g., BL) lookup (or process) indicate that the destination address can be learned (e.g., no error conditions, port is enabled for learning, etc.).

When the learning lookup happens, an attempt is made to read the destination address from the table stored in the circuit 118 (e.g., the step 164). If the destination address is in the table, an age of the corresponding data sets are updated in the step 166 based on the learning information. The age update happens in all of the circuits 116-120 in parallel (or simultaneously). If the destination address is not in the table, the data set of an oldest address that is not static is replaced by a newly learned address in the step 168.

Figure 6:
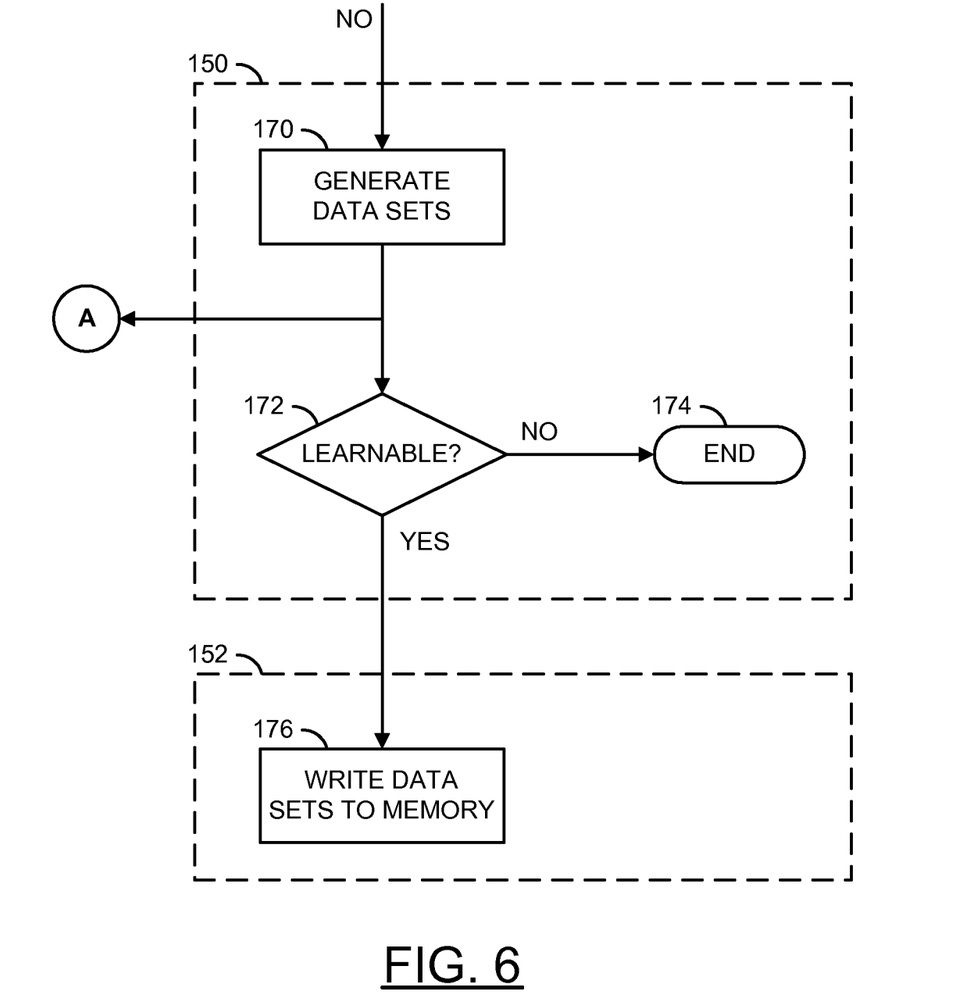
FIG. 6 is a diagram of an example implementation of learning steps.

Referring to FIG. 6, a flow diagram of an example implementation of the learning steps 150 and 152 are shown. The step 150 is shown comprising a step (or state) 170, a step (or state) 172 and a step (or state) 174. The step 152 is shown comprising a step (or state) 176.

If the destination address is not in the table, the circuit 126 generates new data sets for the received network packet in the step 170. The new data sets are subsequently processed by the circuits 122-124 in the step 168 (FIG. 5). If the addresses are not learnable, the step 172 ends the learning step 150 in the step 174. If the addresses are learnable, the step 172 continues the learning with the step 152. Within the step 152, the circuit 126 writes the new data sets into the circuits 116-120 in parallel per the step 176. In some embodiments, the writing can take multiple (e.g., up to four) system cycles to complete. Since the circuits 116-120 are dual-port RAMS, the writing of new data sets can occur concurrently with reading from the circuits 116-120 for another network packet.

Aging lookups, external hardware learning events and external software learning events also can happen. The aging lookups and/or external learning events are merged into a learning pipeline of the circuit 126 and are processed when cycles are available. In the event that the learning pipeline is full, the learning is turned off to ensure an integrity of the system.

For forwarding (e.g., bridging), a media access control (e.g., MAC) destination address of each received network packet is submitted as a search argument to an address table in the circuit 118. The search operation results in either a hit (address found) or a miss (address not found). In the case of a hit, the search returns an associated data structure that controls the forwarding of the network packet. In the case of a miss, a virtual local area network (e.g., VLAN) index of the network packet is used to identify a set of ports to which the network packet is to be flooded. The forwarding associated data structure includes, an address index, a destination port map, a source port number, layer 2 ACL deny/permit status and a layer 2 ACL source/destination logging indication.

During learning, the MAC address of every received network packet is submitted as a search argument to an address table in the circuits 116-118. The search operation results in either a hit (address found) or a miss (address not found) in the step 146. In the case of a hit, a source port of the received network packet is compared in the circuit 126 to the associated data in the address table. If the values match, the network packet has already been learned and the address age is refreshed in the step 166. A mismatching source port or a lookup miss results in the network packet being submitted to the hardware-based address learning in the circuit 126. The hardware-based address learning function uses the source port information to update an internal table. The mismatches may also serve as grounds for the discarding of the received network packet. Alternately, unknown source addresses can cause network packets to be discarded if the port is so enabled.

A network packet is routed if addressed at layer 2 to the router MAC address or if associated with one among several standard IP multicast layer 2 addresses. Both comparisons are performed by the circuit 100 before an initial destination map calculation. Determining the destination for the routed network packet is a matter of using the results of an Internet Protocol (e.g., IP) destination address lookup performed during the ACL processing. For bridged network packets (or frames), a multi-bit (e.g., 8-bit) destination index value that results from the MAC destination address lookup is used to select the initial destination map. However, for routed network packets, the multi-bit (e.g., 8-bit) index from the ACL processing is used instead. Therefore, the routed network packets can address all (e.g., 256) entries in a destination map. Furthermore, both the bridging and the routing functions share the one or more registers storing the destination map table.

Both the MAC destination address and the MAC source address are submitted to identical lookups to the same address data base stored in the circuits 116-118. The lookup implements an "exact match" lookup and a hash-based search is used to quickly arrive at a result.

The bridge layer generally supports a lookup of thousands (e.g., 8,192) of MAC addresses. The lookup is broken up into multiple hashes with each hash holding several (e.g., 8) keys and thus totaling the thousands of addresses. The search key for a lookup is a multi-bit address comprised of (i) a MAC address along with a virtual local area network (e.g., VLAN) identifier, in case of an independent virtual local area network learning (e.g., IVL) mode, or zeros in case of a shared virtual local area network learning (e.g., SVL) mode, (ii) the VLAN identifier along with an outer VLAN identifier in case of a QinQ mode (Institute of Electrical and Electronics Engineering Standard 802.1ad—Support on Provider Bridges) or (iii) a multiprotocol label switching (e.g., MPLS) label. A few (e.g., 2) most significant bits of the address generally denote one of the three modes.

The address is fed into the hash function of one of the circuits 110-112 based on a cyclic redundancy check used as an index into the tables in the circuits 116-118 to fetch the keys in the hash. The address is subsequently compared against all keys to see if a match occurs. The address is also associatively checked against all keys in a key cache. In case of a table hit, the results of the lookup are fetched from a results table using the same hash. Otherwise, if a cache hit occurs, the results of the lookup are fetched from a results cache. An address learning event is generated when both cache and table source address lookup result in a miss. In some embodiments, the hash function is a logical exclusive OR of some of the bits. Other hash functions may be implemented to meet the criteria of a particular application.

A lookup hit (e.g., a cache hit or table hit), is also qualified with the age of the address stored being valid. In case of a cache hit, the age of the entry is fetched from an age cache. In case of a table hit, the age of the entry is fetched from an age table. Age is deemed valid when age of the entry is not the same as all ones.

The functions performed by the diagrams of FIGS. 3-6 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROM (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application. As used herein, the term "simultaneously" is meant to describe events that share some common time period but the term is not meant to be limited to events that begin at the same point in time, end at the same point in time, or have the same duration.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
    a parser circuit configured to parse a packet of a plurality of packets received via one network of a plurality of networks to generate a source address, a destination address, and information for said packet of said plurality of packets received during a single cycle; and
    a bridge circuit in communication with said plurality of networks and configured to (i) search a plurality of dual-port memories in parallel during the single cycle or a subsequent cycle of operation in said apparatus, wherein said plurality of dual-port memories are searched by (a) a first lookup of a first data set associated with said source address, (b) a second lookup of a second data set associated with said destination address and (c) a third lookup of a third data set associated with said information, and (ii) bridge said packet along a path between at least two networks of said plurality of networks in response to values generated by both said first lookup and said second lookup, wherein said plurality of dual-port memories are configured to be accessed concurrently with said first lookup, said second lookup, or said third lookup to update a respective dual-port memory with results of a learning operation performed after a miss.

2. The apparatus according to claim 1, wherein said bridge circuit comprises a plurality of hash generators configured to generate a plurality of respective cyclic redundancy checks used as indexes into tables of said dual-port memories by respective hashes of said source address, said destination address and said information in parallel.

3. The apparatus according to claim 2, wherein each dual-port memory of said plurality of dual-port memories comprises a dual-port random access memory (RAM) configured to be read from and written to concurrently.

4. The apparatus according to claim 2, wherein a search key for said first lookup, said second lookup, or said third lookup is a multi-bit address comprising:
    at least two of a media access control (MAC) address, a virtual local area network (VLAN) identifier, and zeros, depending on a network mode;
    the VLAN identifier and an outer VLAN identifier, depending on the network mode; or
    a multiprotocol label switching (MPLS) label, depending on the network mode, wherein, the mode is determined by at least two most significant bits of the multi-bit address.

5. The apparatus according to claim 1, wherein said bridge circuit comprises a learning logic circuit configured to determine if said path of said packet between at least two networks of said plurality networks can be learned.

6. The apparatus according to claim 5, wherein said learning logic circuit is further configured to determine if said second data set associated with said destination address of said packet is currently stored in said plurality of dual-port memories where said path can be learned.

7. The apparatus according to claim 6, wherein said plurality of dual-port memories includes a plurality of data sets, and wherein said learning logic circuit is further configured to update an age of one or more data sets of said plurality of data sets in said packet in response to said second data set being currently stored in said plurality of dual-port memories.

8. The apparatus according to claim 7, wherein said learning logic circuit is further configured to write said generated first data set, said generated second data set, or said generated third data set in parallel into said plurality of dual-port memories concurrently with other lookups related to another packet.

9. The apparatus according to claim 6, wherein said learning logic circuit is further configured to generate said first data set, said second data set, or said third data set associated with respective addresses of said packet in response to the miss.

10. The apparatus according to claim 1, wherein said parser circuit and said bridge circuit are implemented as hardware or as one or more components of an integrated circuit.

11. The apparatus according to claim 1, wherein said first parser circuit is configured to parse said source address and said destination address from said packet and said second parser circuit is configured to parse said information from said packet and to calculate a status of said packet, said status including at least one of: a pass status, a fail status, or a learnable bridge path status.

12. A method for high-speed network bridging, comprising the steps of:
    (A) parsing a packet of a plurality of packets received at an apparatus via one network of a plurality of networks to generate a source address, a destination address and information during a single cycle;

(B) searching a plurality of dual-port memories in parallel during the single cycle or a subsequent cycle of operation in said apparatus, said plurality of dual-port memories having a plurality of data sets, wherein said plurality of dual-port memories are searched by (i) a first lookup of a first data set associated with said source address, (ii) a second lookup of a second data set associated with said destination address and (iii) a third lookup of a third data set associated with said information;

(C) bridging said packet along a path between at least two of said plurality of networks in response to values generated by both said first lookup and said second lookup; and (D) accessing said plurality of dual-port memories concurrently with said first lookup, said second lookup, or said third lookup to update a respective dual-port memory with results of a learning operation performed after a miss.

13. The method according to claim 12, further comprising the step of:
generating a plurality of respective cyclic redundancy checks used as indexes into tables of said plurality of dual-port memories by respective hashes of said source address, said destination address and said information in parallel.

14. The method according to claim 13, wherein each dual-port memory of said plurality of dual-port memories comprises a dual-port random access memory (RAM) configured to be read from and written to concurrently.

15. The method according to claim 12, further comprising the step of:
determining if said path of said packet between at least two networks of said plurality of networks can be learned.

16. The method according to claim 15, further comprising the step of:
determining if said second data set associated with said destination address of said packet is currently stored in said plurality of dual-port memories where said path can be learned.

17. The method according to claim 16, further comprising the step of:
updating an age of one or more data sets of said plurality of data sets of said packet in response to said second data set being currently stored in said plurality of dual-port memories.

18. The method according to claim 17, further comprising the step of:
writing said generated first data set, said generated second data set, or said generated third data set in parallel into said plurality of dual-port memories concurrently with other lookups related to another packet.

19. The method according to claim 16, further comprising the step of:
generating said first data set, said second data set, or said third data set of said packet in response to said miss.

20. An apparatus comprising:
a first parser circuit and a second parser circuit configured to parse a packet of a plurality of packets received via one network of a plurality of networks to generate a source address, a destination address and information for said packet of the plurality of packets received during a single cycle;
a pipeline circuit configured to search a plurality of dual-port memories in parallel during the single cycle or a subsequent cycle of operation in said apparatus, wherein said plurality of dual-port memories are searched by (i) a first lookup of a first data set associated with said source address, (ii) a second lookup of a second data set associated with said destination address and (iii) a third lookup of a third data set associated with said information, wherein the plurality of dual-port memories are configured to be accessed concurrently with the first lookup, the second lookup, or the third lookup to update a respective dual-port memory with results of a learning operation performed after a miss, and wherein said pipelined circuit is further configured to bridge said packet along a path between at least two networks of said plurality of networks in response to values generated by both said first lookup and said second lookup.

* * * * *